March 26, 1940. E. W. ENGLE 2,195,297
METHOD AND APPARATUS FOR MAKING HOT PRESSED HARD METAL COMPOSITIONS
Filed Nov. 4, 1938
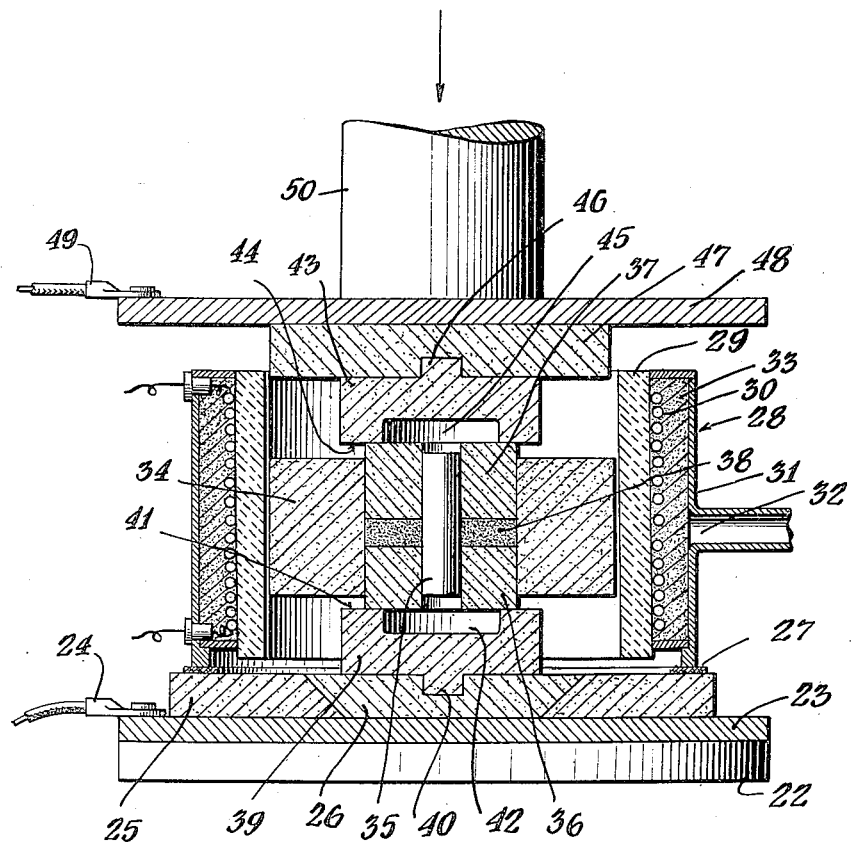
INVENTOR
Edgar W. Engle
BY
Harry E. Dunham
ATTORNEY Patented Mar. 26, 1940

2,195,297

UNITED STATES PATENT OFFICE 2,195,297

METHOD AND APPARATUS FOR MAKING HOT PRESSED HARD METAL COMPOSITIONS

Edgar W. Engle, Noroton, Conn., assignor to Carboloy Company, Inc., Detroit, Mich., a corporation of New York Application November 4, 1938, Serial No. 238,852

17 Claims. (Cl. 75—137)

The present invention relates to a method and apparatus for making shaped masses of hard metallic materials, more particularly the class of materials known in the trade as cemented hard metal carbides, such for example as the material described and claimed in the Schroter Patent 1,549,615, issued August 11, 1925, which by way of example consists mainly of minute hard particles of tungsten carbide cemented together with lower melting point metal such as cobalt. Shaped or molded masses, as drawing dies, tools, wear resistant parts, etc., of such hard metallic materials have heretofore been made by various methods using heat and pressure. The so-called "hot-press" method is broadly characterized by the simultaneous application of both heat and pressure to a charge of starting materials which may be confined in a suitable mold for shaping the mass as desired.

Prior to the present invention difficulties have been encountered in the practice of "hot press" procedures. For example when direct resistance heating, such as heating resulting from passage of electric current through a mold and/or the contents of the mold, i. e., the starting materials, was used frequently localized heating occurred in the mass of starting materials resulting in non-uniform composition. As a result many methods of control have been tried without complete success. It was also found difficult to maintain the mass of starting materials at a proper and uniform working temperature during application of pressure when heating was performed by indirect means such as a surrounding furnace, due to heat losses through pressure applying plungers. Further to obtain properly compacted masses of a desired composition, compression of sufficient magnitude is essential, but in the prior processes too much compression was applied which resulted in uncontrolled "squeeze out" of the lower melting point cementing metallic material, such as the cobalt in the cemented carbide composition. This uncontrolled "squeeze out" not only caused serious loss of cementing material but introduced difficulties in flow-back thereof on the plungers and an ultimate production of non-uniform composition undesirably low in cementing material content.

A general object of the present invention is the provision of an effective method for making such shaped masses which may be readily and cheaply practiced resulting in an efficient production of shaped masses of hard metallic material of superior quality, and the provision of readily made apparatus of simple construction which are capable of efficient and simple use in the practice of the method.

A more specific object is the provision of a "hot press" method characterized by the simultaneous application of heat and pressure with controlled heat supplied in a manner efficiently to heat the mass of starting materials uniformly and effectively to compensate for heat losses during application of pressure whereby the materials are maintained at a proper working temperature during the procedure, and to provide apparatus which can be used efficiently to practice the method and accomplish such results.

A further object is to provide a simple and effective manner of applying a predetermined amount of pressure to the materials to avoid difficulties attendant upon the application of too little or too much pressure, and simple means for consistently and easily performing such functions with maximum assurance of uniform results.

An additional object is the provision of structural embodiments of the apparatus which are readily constructed and permit efficient use and operation thereof.

Other objects of the invention will appear hereinafter.

The novel features which are characteristic of my invention will be set forth with particularity in the appended claims. My invention itself however will best be understood from reference to the following specification when considered in connection with the accompanying drawing in which the single figure is a sectional elevational view of the apparatus whereby my invention may be carried into effect.

By the present invention the difficulties attendant upon the use of prior art methods and apparatus are substantially eliminated. The present method involves controlled combination heating comprising heating accomplished by a surrounding furnace of suitable type, such as a furnace using resistance elements for source of heat, and direct heating resulting from passing electric current of suitable amperage and voltage directly through the mold and/or the mass of starting materials therein. The starting materials are placed in a mold of suitable shape, preferably formed from heat refractory material which is a good conductor of heat. If it is desired to pass electrical current through the mold as well as the contents thereof for direct heating, the mold material is also an electrical conductor. Suitable mold material may be refractory metal such as tungsten, molybdenum, etc., lined with lime, graphite, etc. to prevent the starting materials from sticking thereto. I prefer however to form the mold from carbonaceous material such as graphite.

It is preferred, after placing a charge of starting materials in the mold and placing a pressure applying plunger in contact therewith, to heat the mold and contents to a working temperature by means of a surrounding furnace and then compensate for heat losses due to conductivity of the plunger and other structural parts by augmenting the furnace heating with an auxiliary source of heat supplied to the mold, plunger and/or charge of starting materials.

By proper correlation of the dimensions of the hole in the mold, the amount and character of starting materials, the working temperature and the distance of travel of the plunger into the mold, the contents of the mold may be compressed a predetermined amount. With an apparatus designed to mold shaped masses of certain dimensions from a given type of starting materials at a certain working temperature a predetermined compression may be applied to the successive charges by providing means for limiting the travel of the plunger to a distance previously calculated to result in the desired compression. This may be accomplished by any of many suitable structures but preferably by associating abutment means with a plunger or pressure applying parts of a press which will engage an end of the mold and stop further travel of the plunger into the mold as the desired compression is obtained.

The plunger may be formed from material similar to that from which the mold is formed, selection being governed by the requirements of the particular procedure to be carried out by the apparatus. It should be heat refractory, have sufficient strength to withstand the pressure to which it is to be subjected, and should be electrically conducting. Carbonaceous material such as graphite is preferred.

The drawing shows by way of example a type of apparatus particularly adapted for the production of thin discs and the like. Upon a steel base 22 of a suitable press is positioned an electrode plate 23 of suitable material, such as phosphor bronze. The base 22 and plate 23 are preferably water cooled in a known manner by structure not shown. A terminal 24 mounted on the plate 23 is adapted to connect it to a suitable auxiliary source of electric current. A base plate 25, preferably of graphite, is positioned upon the electrode plate 23 and in the preferred form is provided with a wedging insert 26 which has been found to eliminate difficulties previously experienced in obtaining a good contact between the electrode plate 23 and the graphite plate 25. The wedging insert presents a relatively small surface area to the electrode plate 23 which will make good contact therewith when pressure is applied to the assembly more readily than a plate of larger surface area, such as a unitary plate of dimensions similar to those of plate 25. A relatively thin annulus 27 of insulating material, such as asbestos, is located on the top of plate 25 for supporting a furnace 28 of suitable structure.

The furnace 28 may be a molybdenum wire wound furnace comprising a tube 29 of suitable refractory material, such as alundum, which is porous and will permit ready transfer of heat and non-oxidizing atmosphere therethrough. Upon the outer surface of the tube 29 is located an electrical heating coil 30, preferably of molybdenum wire. In the preferred construction the turns of the coil 30 adjacent the ends of the tube 29 are spaced closer together than the turns near the center of the coil to thereby compensate for end cooling from conduction, radiation, etc. The turns of the coil 30 are held in position by any suitable means, preferably by suitable hardened plastic refractory material. The wire wound tube 29 is positioned within a steel shell 31 having an inlet 32 for inert or reducing gas to permit the maintenance of the mold and contents during operation within a non-oxidizing atmosphere. The space between the shell 31 and the tube 29 may be filled with suitable insulating material 33, such as granular magnesium oxide. The steel shell is supported by the insulating annulus 27, as shown.

A mold 34 preferably comprises an annulus of suitable material such as graphite, of an outer diameter such that the outer surface of the mold closely approaches the inner surface of the tube 29 to obtain the highest possible efficiency in transfer of heat. Prior to positioning of the mold 34 within the furnace 28 a core 35, plungers 36 and 37, preferably of graphite, and an intervening charge 38 of starting materials are assembled therein.

A member 39 of suitable material, such as graphite, is placed upon the base plate insert 26 with a projection 40 on the former seating in a recess in the latter, as shown. The member 39 preferably has an outer diameter larger than the diameter of the hole in the mold so that the outer peripheral portion 41 of the upper face thereof will abut against the bottom end of the mold after a predetermined travel of the plunger 36 into the mold. The upper face of member 39 is preferably provided with a recess 42 so that contact between member 39 and plunger 36 is limited to that portion of the face of the plunger which is adjacent its periphery. The reduction of the area of contact between the member and the plunger increases the electrical resistance and localizes electric current flow to thereby develop the desired heating at maximum efficiency and reduce heat losses resulting from conduction to the pressure parts of the press.

A member 43 similar to member 39 is placed in contact with the upper end of plunger 37 and is of such size that the outer portion 44 of the face thereof will contact the upper end of the mold 34 to limit travel of the plunger 37 into the mold. The member 43 is provided with a recess 45 similar to the recess 42 and for like purposes. A projecting portion 46 seats within a recess in the face of a top plate 47 preferably of graphite, adapted to move freely into the tube 29, preferably with the periphery thereof close to the inner wall of the tube, for substantially closing the furnace. Another electrode plate 48, preferably of phosphor bronze, is seated upon the plate 47 and a terminal 49 connects this electrode plate to the other side of the aforesaid auxiliary source of electric current so that an electrical circuit may be completed through electrode plates 23 and 48, plungers 36 and 37, charge 38, and mold 34 when the members 39 and 43 engage the ends of the latter. Plunger 50 of a suitable press applies pressure to the mold assembly within the furnace 28 causing the mold plungers 36 and 37 to travel a limited distance within the mold 34. If desired, the electrode plate 48 and press plunger 50 may be water-cooled.

In operation after a charge 38 of starting materials, such as powdered tungsten carbide and cobalt, has been placed in the mold 34 between plungers 36 and 37, the mold and assembled plungers are positioned in furnace 28 with the whole assembly loaded in a press as shown. A non-oxidizing atmosphere is then supplied to the furnace through the inlet 32 and the furnace is heated by electric current supplied to the coil 30 until the contents of the mold are brought up to working temperature such for example as about 1350 to 1700° C. Pressure is now applied to the charge in the mold by plungers 36 and 37 and simultaneously electric current of relatively low voltage, for example about 3 to 12 volts and relatively high amperage, for example from several hundred to several thousand amperes, is passed through the charge 38, mold 34 and electrode plates 23 and 48 to thereby compensate for any heat losses due to the conductivity of plungers 36 and 37, members 39 and 43, and plates 25 and 47, so that the charge will be maintained at a uniform temperature. Plungers 36 and 37 travel into mold 34 until members 39 and 43 engage the ends of the mold 34. This results in the compression of the charge to a predetermined extent sufficient to produce a molded mass of desired density while accurately controlling the amount of "squeeze out." Although uncontrolled squeeze-out is objectionable, a slight amount is useful since it insures that compression is complete and that pits and porosity are eliminated. The slight loss in binder or lower melting point metal occasioned by controlled squeeze-out is preferable to a product having pits or porosity. If desired, however, an additional quantity of binder metal may be added to the charge to compensate completely for any squeeze-out. It is obvious that other means of limiting travel of the plungers into the mold may be used, for example plungers having flanges or suitable projections adapted to engage the ends of the mold for limiting travel thereof may be substituted for the plungers 36 and 37 and the members 39 and 43. Also, if desired, the travel of the plungers may be limited or controlled by devices external to the furnace. For example gages or indicators may be employed which show not only the distance but the speed of travel.

By the practice of the above method and the use of the apparatus shown, it has been found possible to produce readily and efficiently discs three inches in diameter and from 1/16 to 3/32 of an inch thick from powdered tungsten carbide mixed with about 6% by weight of powdered cobalt and 20 carats of diamond dust of about 80 to 120 mesh. Such discs have a uniform composition and also the requisite characteristics for withstanding severe conditions of use for unusually long service periods. Obviously the shape of the mold and plungers may be altered as desired to suit the conditions of use. For example, a flat faced block may be substituted for the bottom plunger 36 and a block having a conical face may be substituted for the plunger 37 for the production of metal drawing dies.

It is to be understood that although the present method and apparatus are particularly adapted for molding masses of cemented hard metal carbides they may be employed if desired in connection with other metallic compositions such as particles of hard refractory metal, e. g., tungsten, molybdenum, etc., cemented together by lower melting point metal, such as a metal of the iron group, etc.

What I claim as new and desire to secure by Letters Patent of the United States, is:

1. The method of making a compact, molded mass which comprises placing starting material in a mold, heating the starting material in said mold to a proper working temperature, thereafter applying pressure to said starting material and simultaneously completing an electric circuit through said pressure applying means to thereby supply sufficient independent additional heat thereto to offset heat losses through said pressure applying means.

2. The method of making a compact, molded, cemented hard metal carbide, which comprises placing starting materials in a mold, heating said starting materials to a desired working temperature, thereafter applying pressure to said starting materials and simultaneously passing an electric current through said starting materials and pressure applying means to supply thereby sufficient additional heat to compensate for heat lost by conduction through said pressure applying means, and to maintain said starting material at said working temperature during the application of pressure.

3. The method of making compact, molded, cemented hard metal carbide, which comprises placing starting materials in a mold, heating said materials to a desired working temperature, thereafter applying pressure to said materials in said mold and simultaneously augmenting said heating by passing an electric current through said materials and pressure applying means.

4. The method of making compact cemented hard metal carbide, which comprises confining starting materials in a mold of heat refractory material, heating said materials to a desired working temperature, compressing said materials to a predetermined extent while simultaneously augmenting said heating by passing an electric current through said materials and pressure applying means.

5. The method of making alloys consisting substantially of a mixture of hard metal particles and softer metal which comprises placing said mixture in a mold, inserting said mold and mixture in a furnace, heating the mixture to a working temperature in a non-oxidizing atmosphere in said furnace, thereafter compressing said mixture a predetermined amount and simultaneously passing an electric current through it and said pressure applying means to thereby compensate for any loss of heat through said pressure applying means.

6. Apparatus for molding masses of hard metallic materials, comprising a mold of heat conducting refractory material closely surrounded by a furnace adapted readily to heat said mold and its contents to a working temperature, means to apply pressure to the contents of said mold, and additional heating means for heating the mold contents by direct resistance heating to compensate for heat losses through said pressure applying means.

7. Apparatus for molding masses of hard metallic materials, comprising a mold of heat refractory and electrical conducting material surrounded by a furnace adapted readily to heat said mold and its contents to a working temperature, plungers of heat refractory and electrical conducting material adapted to apply pressure to the contents of said mold, and electrical conductors connected to said plungers whereby electrical current may be passed through said mold and contents to develop heat sufficient for compensating for heat losses through said plungers.

8. Apparatus for molding masses of powdered material, comprising a mold of carbonaceous material surrounded by a furnace adapted readily to heat said mold and its contents, a plunger of carbonaceous material adapted to be received in said mold, means including said plunger as an electrode for passing electrical current through the mold and contents, means for forcing said plunger into said mold for applying pressure to the contents, and means including said mold for limiting the movement of said plunger.

9. Apparatus for molding masses of powdered material, comprising a mold of heat conducting refractory material surrounded by a furnace for heating the contents of said mold to working temperature, a member of electrical conducting and heat refractory material closing the bottom of said mold, pressure applying means comprising a plunger adapted to be received in said mold, means limiting the travel of said plunger in said mold at a predetermined point, means including said member and said plunger for passing electrical current through the contents of said mold, to thereby compensate for any loss of heat through said plunger.

10. Apparatus for molding masses of powdered material, comprising a mold of heat conducting refractory material surrounded by a furnace adapted readily to heat the contents of said mold, pressure applying means comprising a pair of plungers of predetermined length adapted to be received in opposite ends of said mold, pressure applying members adapted to make contact with the outer ends of said plungers and supply electrical current thereto, the diameters of said members being greater than the diameter of the hole in said mold thereby to engage the ends of said mold and limit the travel of said plungers whereby the contents of said mold may be compressed a predetermined amount.

11. Apparatus for molding masses of powdered material, comprising a mold of heat and electrical conducting refractory material surounded by a furnace adapted readily to heat said mold and contents, and pressure applying means comprising a pair of plungers of electrical conducting and heat refractory material constituting electrodes of predetermined length adapted to be received in opposite ends of said mold and pressure applying members of electrical conducting material adapted to make contact with the outer ends only of said plungers to supply electric current thereto, said members being wider than the hole in said mold thereby to engage the ends of said mold and limit the travel of said plungers.

12. Apparatus for molding masses of powdered material, comprising an annular mold of carbonaceous material closely surrounded by an electrical resistance furnace adapted readily to heat said mold and its contents, a pair of plungers of predetermined length adapted to be received in opposite ends of said mold, pressure applying cylindrical members of electrical conducting material adapted to make contact with the outer ends of said plungers to supply electric current thereto, said members having outer diameters greater than the diameter of the hole in said mold to engage the ends of said mold and limit the travel of said plungers, each of said members having its engaging face constituting an annular surface adapted only to engage the portion of an end of said mold adjacent the hole therein and the outer portion of an end of one of the plungers adjacent the periphery thereof.

13. Apparatus for molding masses of hard metallic materials comprising a mold, means for heating starting materials in the mold to a working temperature, pressure applying means comprising a plunger adapted to be received in said mold, supplemental means for passing an electric current through said plunger to augment said first mentioned means and means associated with said plunger adapted to engage an end of said mold to limit the travel of said plunger therein whereby the compression of said starting materials may be limited to a predetermined amount.

14. Apparatus for molding masses of cemented hard metal carbide comprising a mold, means for heating a charge of starting materials therein, a pair of plungers adapted to be received in opposite ends of said mold for applying pressure to contents of said mold, means for compensating for loss of heat through said plungers, means for applying pressure to said plungers, and means associated with said plungers to limit the travel of said plungers in said mold.

15. A mold adapted for hot pressing mixtures consisting of hard carbide particles and softer binder metal, said mold having an opening therethrough, a pair of plungers mounted in opposite ends of said opening and adapted to compress material in said mold, means for applying pressure to said plungers, and means for controlling the quantity of softer metal squeezed out of said mixture during the application of pressure thereto.

16. A mold adapted for hot pressing mixtures consisting of hard carbide particles and softer binder metal, said mold having an opening therethrough, a pair of plungers mounted in opposite ends of said opening and adapted to compress material in said mold, means for applying pressure to said plungers, said mold being adapted for limited longitudinal movement and for limiting the movement of said pressure applying means to a predetermined amount and thereby control the quantity of softer metal squeezed out of said mixture during the application of pressure thereto, and a stationary electrically heated furnace surrounding but spaced from said mold and plungers, said furnace being adapted to heat said mixture to a predetermined working temperature.

17. A mold having an opening therethrough, a pair of plungers mounted in opposite ends of said opening and adapted to compress material in said mold, means for applying pressure to said plungers, said mold being adapted to limit the movement of said pressure applying means to a predetermined amount, and an electrically heated furnace surrounding but spaced from said mold and plungers, said furnace comprising a coil consisting of a series of turns, the spacing between said turns being greater at the center of the coil than at the ends thereof, said pressure applying means and plungers comprising part of an electric circuit adapted to supply auxiliary heat to the material in the mold.

EDGAR W. ENGLE.